United States Patent
Lai et al.

(10) Patent No.: US 8,165,423 B2
(45) Date of Patent: Apr. 24, 2012

(54) PORTABLE DEVICE HAVING VIBRATION REDUCTION FUNCTION AND VIBRATION REDUCTION METHODE THEREOF

(75) Inventors: Ying-Tso Lai, Taipei Hsien (TW); Paul Green, Cambridge, MA (US)

(73) Assignees: Hon Hai Precision Industry Co., Ltd., Tu-Cheng, New Taipei (TW); Massachusetts Institute of Technology, Cambridge ( * ) Notice: Subject to any disclaimer, the term of this patent is extended or adjusted under 35 U.S.C. 154(b) by 269 days.

(21) Appl. No.: 12/650,435

(22) Filed: Dec. 30, 2009

(65) Prior Publication Data

US 2011/0158553 A1 Jun. 30, 2011

(51) Int. Cl.
G06K 9/40 (2006.01)
(52) U.S. Cl. .................. 382/275; 702/145
(58) Field of Classification Search ........ 382/275, 382/133, 278, 294; 706/22; 369/103
See application file for complete search history.

(56) References Cited

U.S. PATENT DOCUMENTS

| 7,263,454 B2* | 8/2007 | Morell et al. ............ 702/116 |
| 8,064,720 B2* | 11/2011 | Ozluturk ............ 382/275 |
| 2009/0051652 A1* | 2/2009 | Lee et al. ............ 345/158 |
| 2010/0061219 A1* | 3/2010 | Soh et al. ............ 369/263.1 |

* cited by examiner

*Primary Examiner* — Vikkram Bali
*Assistant Examiner* — Nancy Bitar
(74) *Attorney, Agent, or Firm* — Altis Law Group, Inc.

(57) ABSTRACT

A portable device includes a central processing unit, a vibration sensor to sense vibration of the portable device, an image processing unit to process image data, and a memory unit storing a vibration reduction module. The vibration reduction module includes a vibration signal collecting sub-module to collect a vibration signal of the portable device, a filter sub-module to filter noise of the vibration signal, a vibration offset calculating sub-module to calculate a vibration offset of the portable device according to the filtered vibration signal, a vibration compensation calculating sub-module to calculate a compensation value corresponding to the vibration offset of the portable device, and an image controlling sub-module to control images of the portable device to move a distance which is equal to the compensation value via the image processing unit, to make the images of the portable device keep a fixed position.

7 Claims, 3 Drawing Sheets

PORTABLE DEVICE HAVING VIBRATION REDUCTION FUNCTION AND VIBRATION REDUCTION METHODE THEREOF

BACKGROUND

1. Technical Field

The present disclosure relates to portable devices and, particularly, to a portable device and a vibration reduction method of the portable device to reduce vibration influence.

2. Description of Related Art

Many kinds of portable devices, such as eBook readers, portable computers, smartphones, handheld game consoles, are often used on the move. For example, a user watches an eBook reader when he or she travels by subway, the train vibrates in operation, which may affect use of the device for the user.

DETAILED DESCRIPTION

Figure 1:
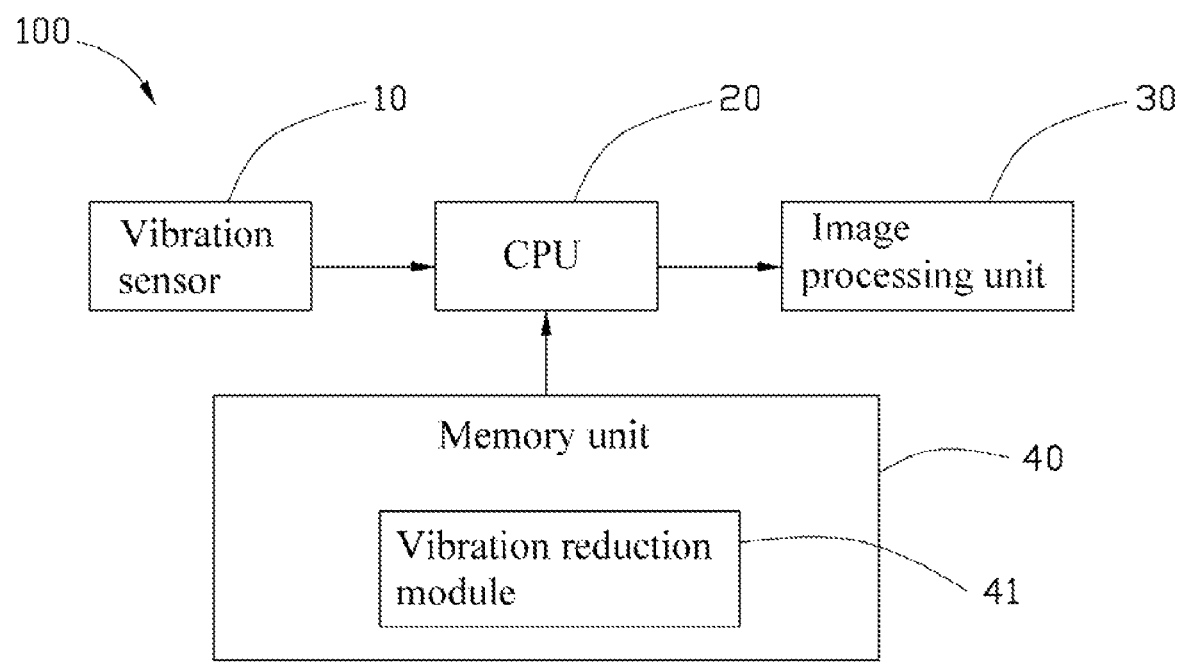
FIG. 1 is a block diagram of an exemplary embodiment of a portable device, the portable device including a vibration reduction module.
Figure 2:
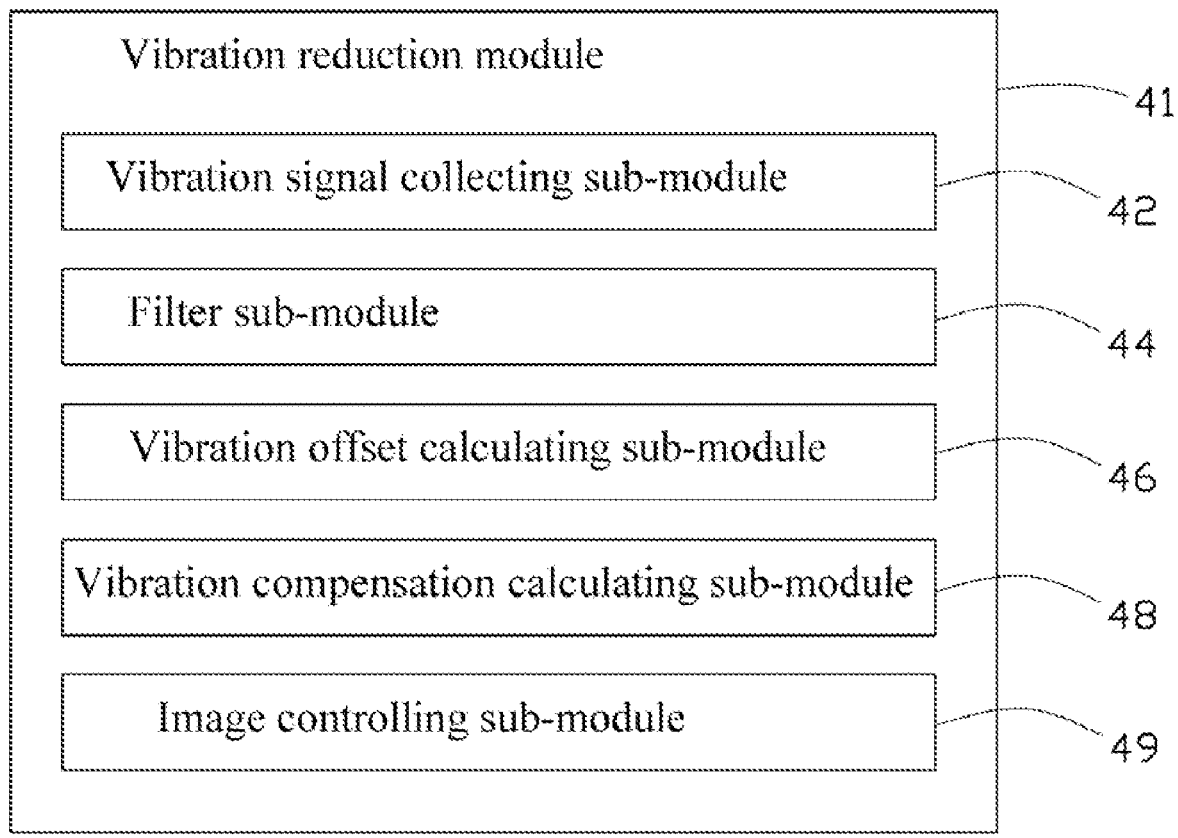
FIG. 2 is a block diagram of the vibration reduction module of the portable device of FIG. 1.

Referring to FIGS. 1 and 2, an exemplary embodiment of a portable device 100 includes a vibration sensor 10, a central processing unit (CPU) 20, an image processing unit 30, and a memory unit 40. The portable device 100 may be an eBook reader, a portable computer, a smartphone, a handheld game console, or another kind of portable device. It may be understood that the CPU 20 is used to process programs of the portable device 100 and the image processing unit 30 is used to process image data, the CPU 20 and the image processing unit 30 are well-known technology, and so are not described here.

The vibration sensor 10 may be an accelerator or a gyroscope, used to sense vibration of the portable device 100. The memory unit 40 includes a vibration reduction module 41. The CPU 20 is used for executing programs stored in the vibration reduction module 41 for reducing vibration of the portable device 100. The vibration reduction module 41 includes a vibration signal collecting sub-module 42, a filter sub-module 44, a vibration offset calculating sub-module 46, a vibration compensation calculating sub-module 48, and an image controlling sub-module 49.

The vibration signal collecting sub-module 42 is used to determine whether the vibration sensor 10 senses vibration of the portable device 100. When the vibration sensor 10 senses vibration of the portable device 100, the vibration signal collecting sub-module 42 collects a vibration signal of the portable device 100 and transmits the vibration signal to the filter sub-module 44.

The filter sub-module 44 is used to filter noise of the vibration signal, and transmit the filtered vibration signal to the vibration offset calculating sub-module 46. In one embodiment, the filter sub-module 44 is a Kalman filter.

The vibration offset calculating sub-module 46 is used to calculate a vibration offset of the portable device 100 according to the filtered vibration signal, and transmit the vibration offset to the vibration compensation calculating sub-module 48. For example, the vibration offset may be a rightward 3 centimeter (cm) distance.

The vibration compensation calculating sub-module 48 is used to calculate a compensation value corresponding to the vibration offset of the portable device 100, and transmit the compensation value to the image controlling sub-module 49. For example, the compensation value may be a leftward 3 cm distance.

The image controlling sub-module 49 is used to control images of the portable device 100 to move a distance which is same to the compensation value via the image processing unit 30, such as move a 3 cm distance leftward, therefore the images of the portable device 100 will keep a fixed position relative to the user, which cannot influence the user to watch the images of the portable device 100 when the portable device 100 is at vibration status.

For example, when a user uses the portable device 100 in a bus, when the portable device 100 is vibrated to 3 cm rightward, the images of the portable device 100 will move 3 cm distance leftward via the CPU 20 executing programs stored in the vibration reduction module 41.

Figure 3:
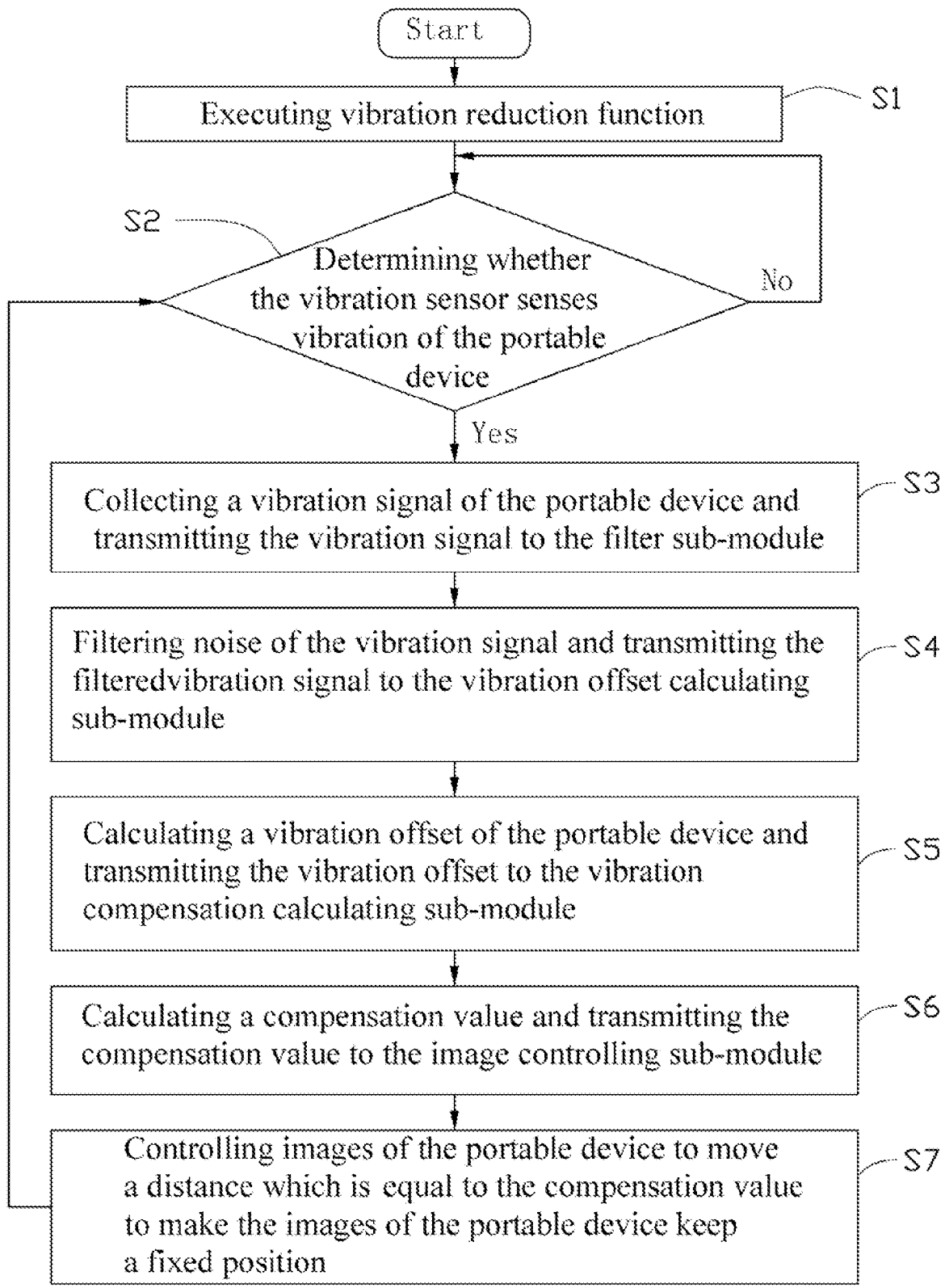
FIG. 3 is a flowchart of an exemplary embodiment of a vibration reduction method for the portable device of FIG. 1.

Referring to FIG. 3, an exemplary embodiment of a vibration reduction method of the portable device 100 includes the following steps.

In step S1, a vibration reduction function of the portable device 100 is executed, such as driving a switch of a program window.

In step S2, the vibration signal collecting sub-module 42 determines whether the vibration sensor 10 senses vibration of the portable device 100. If the vibration sensor 10 senses vibration of the portable device 100, the process goes to step S3, if the vibration sensor 10 does not sense vibration of the portable device, the vibration signal collecting sub-module 42 continues to determine.

In step S3, the vibration signal collecting sub-module 42 collects a vibration signal of the portable device 100 and transmits the vibration signal to the filter sub-module 44.

In step S4, the filter sub-module 44 filters noise of the vibration signal, and transmits the filtered vibration signal to the vibration offset calculating sub-module 46.

In step S5, the vibration offset calculating sub-module 46 calculates a vibration offset of the portable device 100 according to the filtered vibration signal, and transmits the vibration offset to the vibration compensation calculating sub-module 48.

In step S6, the vibration compensation calculating sub-module 48 calculates a compensation value corresponding to the vibration offset of the portable device 100, and transmits the compensation value to the image controlling sub-module 49.

In step S7, the image controlling sub-module 49 controls images of the portable device 100 to move a distance which is equal to the compensation value via the image processing unit 30, therefore the images of the portable device 100 will keep a fixed position relative to the user, which cannot influence the user to watch the images of the portable device 100 when the portable device 100 is at vibration status.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A portable device comprising:

a central processing unit (CPU) to process programs of the portable device;

a vibration sensor to sense vibration of the portable device;

an image processing unit to process image data; and a memory unit storing a vibration reduction module executed by the CPU, the vibration reduction module comprising:

a vibration signal collecting sub-module to determine whether the vibration sensor senses vibration of the portable device, and collect a vibration signal of the portable device in response to the vibration sensor sensing vibration of the portable device;

a filter sub-module to receive the vibration signal and filter noise of the vibration signal;

a vibration offset calculating sub-module to receive the filtered vibration signal and calculate a vibration offset of the portable device according to the filtered vibration signal;

a vibration compensation calculating sub-module to receive the vibration offset and calculate a compensation value corresponding to the vibration offset of the portable device; and an image controlling sub-module to receive the compensation value and control images of the portable device to move a distance which is equal to the compensation value via the image processing unit, to make the images of the portable device keep a fixed position relative to a user of the portable device.

2. The portable device of claim 1, wherein the vibration sensor is an accelerator or a gyroscope.

3. The portable device of claim 1, wherein the filter sub-module is a Kalman filter.

4. The portable device of claim 1, wherein the portable device is an eBook reader, a portable computer, a smartphone, or a handheld game console.

5. A vibration reduction method of a portable device, the vibration reduction method comprising:

determining whether a vibration sensor senses vibration of the portable device; collecting a vibration signal of the portable device, in response to the vibration sensor sensing vibration of the portable device;

receiving the vibration signal and filtering noise of the vibration signal to produce a filtered vibration signal;

calculating a vibration offset of the portable device according to the filtered vibration signal;

calculating a compensation value corresponding to the vibration offset of the portable device; and processing image data from an image processing unit;

controlling images of the portable device to move a distance which is equal to the compensation value via the image processing unit, to make the images of the portable device keep at a fixed position relative to a user of the portable device.

6. The vibration reduction method of claim 5, wherein the vibration sensor is an accelerator or a gyroscope.

7. The vibration reduction method of claim 5, wherein the portable device is an eBook reader, a portable computer, a smart phone, or a handheld game console.

* * * * *